(12) United States Patent
George et al.

(10) Patent No.: US 8,846,555 B2
(45) Date of Patent: Sep. 30, 2014

(54) SILICA AND FLUORIDE DOPED HEAVY METAL OXIDE GLASSES FOR VISIBLE TO MID-WAVE INFRARED RADIATION TRANSMITTING OPTICS AND PREPARATION THEREOF

(75) Inventors: Simi George, Pittston, PA (US); Sally Pucilowski, Duryea, PA (US)

(73) Assignee: Schott Corporation, Elmsford, NY (US)

( * ) Notice: Subject to any disclaimer, the term of this patent is extended or adjusted under 35 U.S.C. 154(b) by 186 days.

(21) Appl. No.: 13/531,947

(22) Filed: Jun. 25, 2012

(65) Prior Publication Data

US 2013/0344312 A1 Dec. 26, 2013

(51) Int. Cl.
| | |
|---|---|
| *C03C 3/112* | (2006.01) |
| *C03C 3/102* | (2006.01) |
| *C03C 3/07* | (2006.01) |
| *C03C 4/10* | (2006.01) |

(52) U.S. Cl.
CPC . *C03C 3/112* (2013.01); *C03C 3/07* (2013.01); *C03C 3/102* (2013.01); *C03C 4/10* (2013.01)
USPC .................. 501/57; 501/60; 501/74

(58) Field of Classification Search
CPC ............ C03C 3/12; C03C 3/102; C03C 3/07; C03C 4/10
USPC ................................. 501/57, 60, 74
See application file for complete search history.

(56) References Cited

U.S. PATENT DOCUMENTS

| | | | |
|---|---|---|---|
| 3,723,141 A | 3/1973 | Dumbaugh, Jr. | |
| 3,947,089 A | 3/1976 | Rapp | |
| 4,483,931 A | 11/1984 | Dumbaugh, Jr. et al. | |
| 4,674,835 A | 6/1987 | Mimura et al. | |
| 5,093,287 A * | 3/1992 | Borrelli et al. | 501/41 |
| 5,093,288 A | 3/1992 | Aitken et al. | |
| 5,114,884 A | 5/1992 | Lapp et al. | |
| 5,148,510 A * | 9/1992 | Borrelli et al. | 385/142 |
| 5,168,079 A | 12/1992 | Aitken et al. | |
| 5,274,728 A | 12/1993 | Tran | |
| 5,283,211 A | 2/1994 | Aitken et al. | |
| 5,668,066 A | 9/1997 | Oguma et al. | |
| 6,599,852 B2 | 7/2003 | Kondo et al. | |
| 6,599,863 B1 | 7/2003 | Palmer et al. | |
| 6,620,748 B1 | 9/2003 | Sugimoto et al. | |
| 6,653,251 B2 | 11/2003 | Sugimoto et al. | |
| 2001/0044369 A1 | 11/2001 | Sugimoto et al. | |
| 2002/0041750 A1 | 4/2002 | Chacon et al. | |
| 2003/0064878 A1 | 4/2003 | Sugimoto et al. | |
| 2005/0037913 A1 | 2/2005 | Peuchert et al. | |
| 2006/0063660 A1 | 3/2006 | Schreder et al. | |

FOREIGN PATENT DOCUMENTS

JP 63-274638 A 11/1988

OTHER PUBLICATIONS

International Search Report for PCT/US2013/047496 (Sep. 11, 2013).
Written Opinion of the International Searching Authority for PCT/US2013/047496 (Sep. 11, 2013).
Patent Abstracts of Japan—Publication No. 63274638 (Nov. 11, 1988).
Database WPI Week 198851—AN 1988-364649—XP-002712687.
C. Follet-Houttemane et al., "Silica Doped Bismuth Lead Oxyfluoride Glass Ionic Conductors", Solid State Ionics, vol. 181 (2010) pp. 37-40.
W.H. Dumbaugh et al., "Heavy-Metal Oxide Glasses", Journal of the American Ceramic Society, vol. 75, Issue 9 (1992) pp. 2315-2326.
J.C. Lapp et al., "Recent Advances in Heavy Metal Oxide Glass Research", SPIE, vol. 1327, Properties and Characteristics of Optical Glass II (1990) pp. 162-170.
R. Stepien et al., "Nonlinear Soft Oxide Glasses for Microstructured Optical Fibers Development", Proc. of SPIE, vol. 7746 (2010) pp. 774619-1-774619-8.
K. Kobayasbhi, "Development of Infrared Transmitting Glasses", Journal of Non-Crystalline Solids, vol. 316 (2003) pp. 403-406.

* cited by examiner

*Primary Examiner* — Kaj K Olsen
*Assistant Examiner* — Elizabeth A Bolden
(74) *Attorney, Agent, or Firm* — Millen, White, Zelano & Branigan, P.C.

(57) ABSTRACT

Disclosed are silica and fluoride doped lead-bismuth-gallium heavy metal oxide glasses for visible to mid-wave Infrared Radiation transmitting optics and preparation thereof.

21 Claims, 2 Drawing Sheets

Figure 1. Comparison of transmission spectra of a prior art glass IR1-3 with IR1-SiPbF. The curves shown are for 2.00 mm thick samples.

Stability of the new compositions is illustrated with large bars (27 inches long) produced with standard melting, refining and casting processes disclosed.

SILICA AND FLUORIDE DOPED HEAVY METAL OXIDE GLASSES FOR VISIBLE TO MID-WAVE INFRARED RADIATION TRANSMITTING OPTICS AND PREPARATION THEREOF

SUMMARY OF THE INVENTION

The invention relates to glass materials that transmit light from the visible spectrum to the mid-wave infrared (IR) spectrum, for example, in the 0.5-5 µm wavelength range, with high transmission in the near-infrared range of 0.7 to 1.0 µm and the medium-wave infrared range (MWIR) of 3 to 5 µm. Such materials are used for infrared windows, domes and lens applications, as well as for fiber optics applications.

For example, the glasses of the invention can be used as core glasses in fiber optic taper technology. Such applications involve the use of a core glass and a cladding glass. The core glass is IR transparent, for example transparent to mid-wave infrared light. However, the cladding glass is opaque in the mid-IR spectrum, which necessitates a large core diameter.

The thermal and physical properties of the core and clad glasses should be as similar as possible while keeping the refractive index differences between the two as large as possible. A large index difference is necessary for achieving the desired numerical aperture (NA) of close to 1.0. In order to achieve a large NA, the refractive index of the core glass should generally be higher than 2.0. However, depending on the choice for the cladding glass, it is possible for the refractive index of the core glass to be lower, e.g., 1.8, and yet the glass can still achieve the desired NA.

Clad glasses preferably have the following properties:
1) CTE($10^{-7}$/K)—50, nd—1.48, SP(0 C)—729;
2) CTE($10^{-7}$/K)—92, nd—1.56, SP(0 C)—630; or
3) CTE($10^{-7}$/K)—91, nd—1.57, SP(0 C)—574.

Disclosed glasses herein are suitable for use in IR transmitting fused fiber bundles that can be fabricated into fiber face plates, conduits, flexible image guides, etc. Moreover, these glasses can serve as materials for standard optics, and as IR detector or camera windows.

An objective of the present invention is to provide a "low-cost" heavy metal oxide glass that can transmit light within the visible to infrared spectrum, having high infrared (IR) transmittance, particularly in the mid-wave infrared spectrum, and preferably exhibiting good transmission at wavelengths even above 5.0 µm. The wavelength transparency achieved is preferably within the range of 0.5-5 µm nm with a relatively flat transmission through this region.

Typically, heavy metal oxide glass glasses having high infrared (IR) transmittance in the mid-wave infrared spectrum exhibit a reduced transmission at around 3.0 µm due to residual hydroxyl absorption. Another objective of the invention is to provide a glass in which the reduced transmission at around 3.0 µm is lessened. The contributing factor to loss in this region is the hydroxyl groups that get incorporated into the glass while manufacturing. We demonstrate that these can almost be fully removed.

With regards to fiber optics, a further objective is to provide such a heavy metal oxide glass that is thermally stable, has a drawing temperature below 900° C., and with a softening point (SP) higher than that of the cladding glass so that the rule of a "hard core, soft clad" is met. The clad glass will need to collapse around the core in order to have proper adhesion.

Heavy metal oxide glasses are often used for applications requiring high IR transmittance. However, such glasses have high densities, which is not typically attractive if lightweight optical materials are desired. Thus, a further objective is to provide a heavy metal oxide glass for IR transmission having a lower density than what is typically found in literature.

These objectives are achieved by a glass according to the invention. In accordance with the invention, there is provided a heavy metal oxide glass composition containing silica and fluorides. The inventive glass achieves a reduction of density, while at the same time keeping transmission levels and refractive index values within the ranges desirable for IR transmission applications.

Additionally, the presence of Si and fluoride in the heavy metal oxide glass composition advantageously increases glass transition temperature, Tg, and the softening point by more than 150° C. Higher Tg is attractive since it means that the glasses can be processed for coating and processing under standard conditions. Higher softening point is advantageous because it provides the hardness necessary for the drawing processes. For fused fiber bundles, glasses will need to be drawn and redrawn multiple times, which requires that the compositions have low crystallization tendencies, thus stability under standard processing conditions is extremely important.

Additional advantages aside from the optical and thermal improvements include the use of inexpensive raw materials, ease of processing, stability under manufacturing conditions in large quantities. By tuning the fluoride component in these compositions, which was found to be stably incorporated into the glasses, the transmission window can be further improved.

According to an aspect of the invention, there is provided a heavy metal oxide glass composition based Pb, Bi, Si, Ga, and F comprising (based on mol %):

| Component | Mole % |
| --- | --- |
| PbO | 20.00-40.00 |
| $Bi_2O_3$ | 5.00-20.00 |
| $Ga_2O_3$ | 10.00-30.00 |
| $SiO_2$ | 30.00-50.00 |
| $PbF_2$ | 0.00-20.00 |
| $ZnF_2$ | 0.00-20.00 |
| $InF_2$ | 0.00-20.00 |
| Sum of $PbF_2$, $ZnF_2$, and $InF_2$ | 1.00-20.00 |

At least one mol % of fluoride is required, preferably $PbF_2$, to effectively remove the OH content from the final glass product. More preferably more than 2% fluoride is used.

The glasses of the invention contain as primary constituents Pb, Bi, Ga, Si and F. Further components include Zn and In. Additional constituents may include alkali metals, for example, Na. The glasses may further include additional metals and metalloids, e.g., As, Ge and Sb, as well as various lanthanides, e.g., La and Nb. Additionally, Te may be included. $AlF_3$ and $SrF_2$ are other possible constituents. Ranges depend on the compositions. Ge and Te are typically in the 20-40% range, La, Na in the 5-10% range, As and Sb should be less than 5 mol %. Zn and In can be oxide or fluoride form, at typically 0-15, e.g., 1-10%, e.g., 5%. $AlF_3$ and $SrF_2$ are typically present from 0-15, e.g., 1-10%, e.g., 5%.

Typically, the constituents are added to the glass composition in their oxide forms, e.g., $SiO_2$, PbO, $Bi_2O_3$, and $Ga_2O_3$. However, their fluoro form is also possible, e.g., by adding part of the Pb in the form of $PbF_2$. Fluorine can also be added in the form of other fluoride constituents as $InF_2$ and $ZnF_2$.

Where not indicated otherwise, the % values refer to mol %.

A preferred range for PbO is 20 to 40 mol %, more preferably, 22 to 35%, even more preferably 25 to 31%, for example, 20, 21, 22, 23, 24, 25, 26, 28, 30, 32, 34, 36, 38, 39, or 40 mol %. Higher amounts of PbO shift the IR transmittance to higher wavelengths, but at the same time increase the density of the glass. If higher density glass is acceptable for an end use, the amount of PbO may be even higher, e.g., 45 or 50%, or even more.

A preferred range for $Bi_2O_3$ is 5 to 20 mol %, more preferably, 8 to 12%, even more preferably about 10%, for example, 5, 6, 7, 8, 9, 11, 12, 13, 15, 17, 18, 19, or 20 mol %. Higher amounts of $Bi_2O_3$ tend to cause damage to crucibles during processing. However, higher amounts are otherwise possible, e.g., even up to about 30 or even 35%.

A preferred range for $Ga_2O_3$ is 10 to 30%, more preferably, 12 to 25%, even more preferably 15 to 20%, for example, 11, 12, 13, 14, 16, 18, 21, 22, 23, 24, 25, 26, 28, or 30 mol %. Higher amounts of $Ga_2O_3$ are possible, but generally this component is limited in amount to the preferred ranges due to costs.

In one embodiment, a portion of Ga may be substituted with In, e.g., up to about half thereof.

A preferred range for $SiO_2$ is 30 to 50%, more preferably, 35 to 45%, even more preferably about 40 to 44%, for example, 30, 31, 32, 33, 34, 35, 36, 38, 40, 42, 44, 46, 48, 49, or 50 mol %. Higher amounts of $SiO_2$ shift the IR transmittance to lower wavelengths, but at the same time advantageously decrease the density of the glass. As such, the amount of $SiO_2$ is generally controlled by the desired balance between density and an acceptable shift in IR transmittance.

A preferred range for total amount of fluoride added, e.g., in the form of $PbF_2$, $InF_2$ and/or $ZnF_2$, is 1 to 20%, more preferably, 5 to 15%, even more preferably 8 to 12%, for example, 2, 3, 4, 5, 6, 7, 8, 9, 10, 11, 12, 13, 14, 15, 16, 17, 18, 19 or 20 mol %. Fluoride is known to be advantageous in heavy metal fluoride glasses to decrease the absorption band associated with the hydroxyl (OH) group typical in oxide-based glasses. However, adding higher amounts of fluoride generally causes difficulties in manufacturing and often requires specialized processing techniques, including quenching, to avoid crystallization. As such, typical heavy metal fluoride glasses contain low amounts of fluoride, which is already advantageous at said low concentrations in decreasing the absorption band associated with OH. Less than 1 mol % is typically used.

Surprisingly, however, in accordance with the invention it was discovered that the glasses herein are capable of incorporating higher amounts of fluoride without crystallization and without any specialized processing techniques, e.g., the process of preparation does not require quenching. Such higher amounts of fluorides in the disclosed glasses surprisingly lead to stable glasses having advantageous physical, e.g., density, properties, while providing glasses that have high IR transmission. For example, up to half of the lead in the disclosed compositions could be added in the form of $PbF_2$ instead of its oxide form. While some fluoride may leave the glass composition during processing, with higher amounts as disclosed herein it is assured that a significant amount remains in the glass product.

In one embodiment, the glasses will not include alkaline earth elements.

In a further embodiment, the glasses will not include Cd or Ba, especially Cd. Cd is known to have high toxicity and should therefore be generally avoided. Even trace amounts of Cd could be considered to cause overexposure at an industrial facility leading to serious health effects or even death.

A glass composition of Stepien et al., cited below, has been disclosed as 40% $SiO_2$, 30% PbO, 10% $Bi_2O_3$, 13% $Ga_2O_3$, and 7% CdO. A sample of this glass was prepared in modified form, i.e., by replacing Cd with Zn due to environmental concerns. Cd and Zn are known to have similarities in physical properties, i.e., they are both Group 12 elements and are solid metals under standard conditions. As such, Zn is an acceptable substitute for Cd. This glass sample was found to be too soft comparably to the glasses of the invention. Thus, such a glass might be useful as a cladding glass for a standard fiber, where high NA is not a requirement, and also as a core glass.

A further objective of the invention is to provide a process for the preparation of the glasses in accordance with the invention that are easy to reproduce, and which process is suitable for production of large quantities of glass. The examples herein were prepared by such a process as described below.

EXAMPLES

Reagent grade powders from commercial vendors were batched and mixed. Typical batch quantities are 2000 g or more. The mixed compositions are melted in either fused Silica or Pt crucibles in an induction furnace and the melting is open to air. The melt temperatures are typically between 115° C. and 1200° C. and the initial melt times were typically between 25 minutes to an hour. Survey melts were tilt poured into traditional stainless steel molds (110 mm×110 mm×40 mm) and annealed. Quenching methods to prevent devitrification was not necessary for any of the compositions disclosed in this invention.

If a particular composition is found to be stable for the process techniques described above, larger melts are completed with 10 Kg or more batch quantities. The liquidized batch material is refined from one to three hours. The refining process involves stirring for homogeneity and dry $O_2$ or $N_2$ bubbling in order to remove the hydroxyl content. Forming is completed by tilt pouring into a stainless steel mold at 1100° C. Annealing occurs above Tg and cooled to room temperature. Large quantities of glass can be prepared this way.

The processing requirements significantly change for smaller to larger batches of glass in this art. Small batches can cool fast without quenching on their own without necessarily crystallizing, e.g., by utilizing other techniques than quenching, e.g., the use of a cool steel plate over which a small amount of glass typically in a thin sheet is poured to cool. However, for larger batches, as disclosed herein, e.g., 2,000 g or more, e.g., 3, kg, 4 kg, 5, kg, 8 kg, 10 kg, 15 kg, and all the way up to large production quantities, e.g., 100 kg, 200 kg, 500 kg to even a ton or multiple tons, such other cooling methods are insufficient and/or impractical. Also, for thicker pieces of glass, e.g., more than a couple of mm thick, e.g., more than 2 mm thick, 4 mm thick, to several centimeters thick, e.g., 1, 2, 3, 4, 5, 10 cm thick, the cooling provided by a cool steel plate is insufficient to avoid crystallization. Surprisingly however, quenching can be avoided with the glasses of the present invention even in large batches of glass while avoiding crystallization.

For fiber processing, Pt downpipes and steel bar molds are used. The pour temperatures are adjusted in accordance with the downpipe diameter and glass viscosity.

The compositions do not require special processing or quenching in order to form stable and clear glass free of striae and inclusions.

The following tables provide results for glasses processed in accord with the disclosure above.

TABLE 1

Glass Compositions (mol %) of the new IR glasses as compared to the prior art literature

| | Prior Art | | | | |
|---|---|---|---|---|---|
| Oxide (mol %) | IR1-3 0.5 L Pt | IR1-Si 0.5 L Pt | IR1-SiPbF 0.5 L Pt | IR1-SiZnF 0.5 L Pt | IR1-SiInF 0.5 L Pt |
| $SiO_2$ | | 42.00 | 42.00 | 42.00 | 42.00 |
| PbO | 57.21 | 30.21 | 25.21 | 25.21 | 25.21 |
| $Bi_2O_3$ | 25.02 | 10.02 | 10.02 | 10.02 | 10.02 |
| $Ga_2O_3$ | 17.77 | 17.77 | 17.77 | 17.77 | 17.77 |
| $PbF_2$ | | | 5.00 | | |
| $ZnF_2$ | | | | 5.00 | |
| $InF_2$ | | | | | 5.00 |

TABLE 2

Measured properties for the new glasses as compared to the prior art glass. Thermal properties and physical properties are shown to improve significantly with the addition of Silica and Fluoride to the original compositions.

| Properties | IR1-3 | IR1-Si | IR1-SiPbF |
|---|---|---|---|
| Index (estimated) | 2.46 | 2.25 | 2.25 |
| Density | 8.181 | 5.933 | 5.883 |
| Linear CTE (20-300) $10^{-7}$ W/mK | 114.5 | 76.5 | 76.7 |
| Glass Transition Point, $T_g$ (° C.) | 326 | 497 | 449 |
| Softening Point (° C.) | 387.4 | 600.6 | 562.5 |

Figure 1:
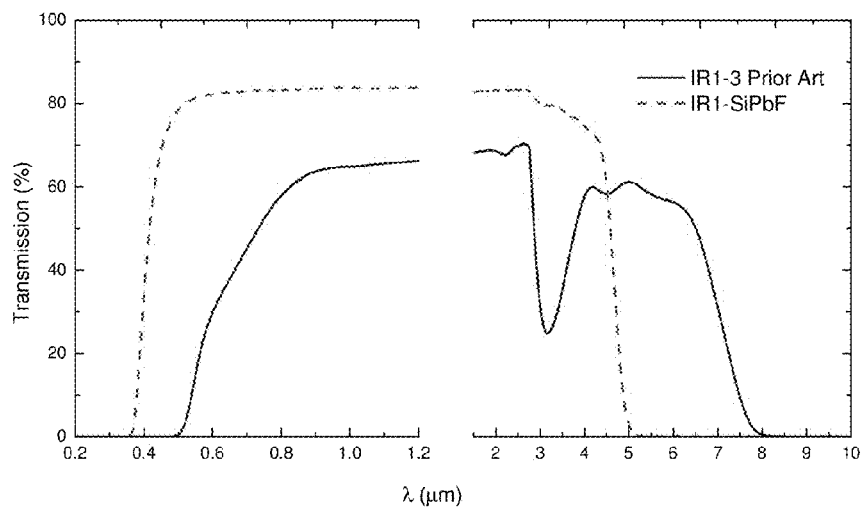
FIG. 1 illustrates a comparison of transmission spectra of a prior art glass IR1-3 with IR1-SiPbF. The curves shown are for 2.00 mm thick samples. Two different instruments are used to measure the transparency window. The plots show the percent transmission. The instruments used for the measurements are a Perkin Elmer Lambda 900 UV/VIS/NIR spectrometer for the shorter wavelengths and a Perkin Elmer Spectrum GX FT-IR system for the longer wavelengths. The break in the plot indicates the change in the instrumentation.
Figure 2:
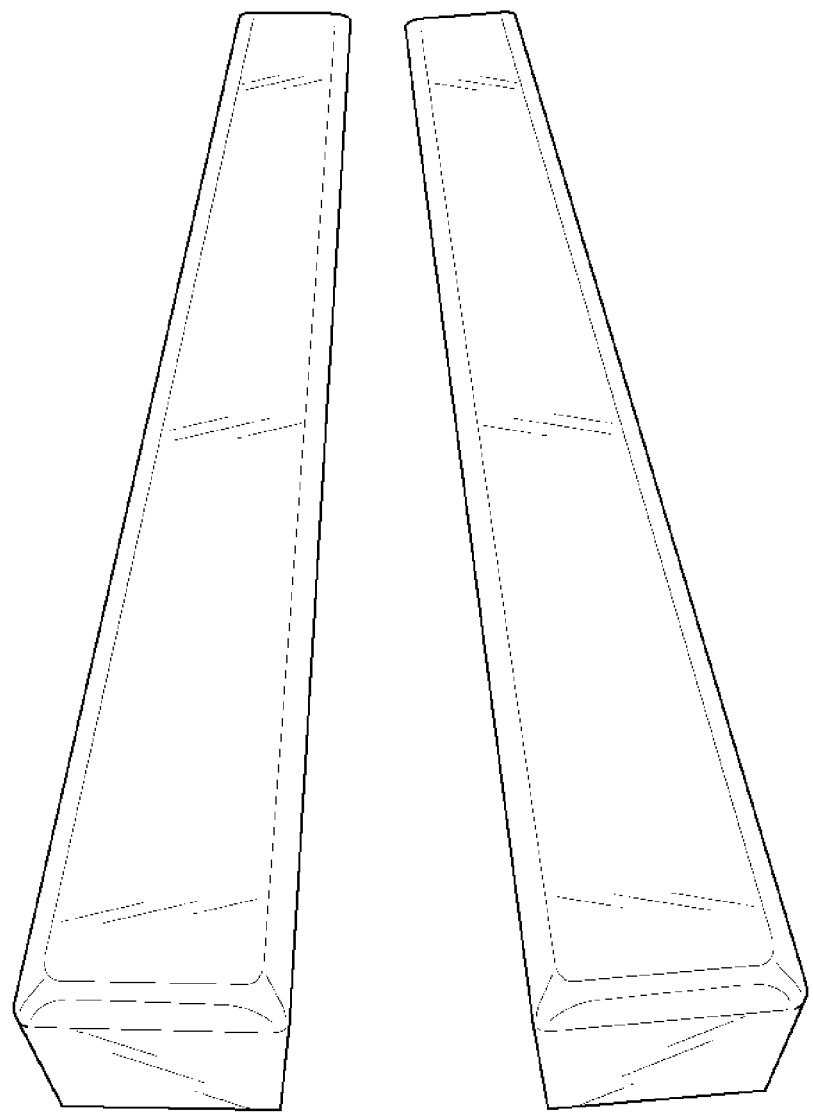
FIG. 2 illustrates the stability of the new compositions with large bars (27 inches long) produced with standard melting, refining and casting processes as disclosed herein.

In preferred aspects, the invention includes:

a glass that contains 22 to 35% PbO;

a glass that contains 8 to 12% $Bi_2O_3$;

a glass that contains 12 to 25% $Ga_2O_3$;

a glass that contains 35 to 45% $SiO_2$;

a glass that contains 5 to 15% total of $PbF_2$, $InF_2$ and/or $ZnF_2$;

a glass that contains

| Oxide (mol %) | | | |
|---|---|---|---|
| $SiO_2$ | 42.00 | 42.00 | 42.00 |
| PbO | 25.21 | 25.21 | 25.21 |
| $Bi_2O_3$ | 10.02 | 10.02 | 10.02 |
| $Ga_2O_3$ | 17.77 | 17.77 | 17.77 |
| $PbF_2$ | 5.00 | | |
| $ZnF_2$ | | 5.00 | |
| $InF_2$ | | | 5.00 | wherein for each amount a deviation of 10% or 20% is possible;

a glass that has the following properties

| Properties | |
|---|---|
| Index | 2.25 |
| Density | 5.883 |
| Linear CTE (20-300) $10^{-7}$ W/mK | 76.7 |
| Glass Transition Point, $T_g$ (° C.) | 449 |
| Softening Point (° C.) | 562.5 | wherein for each value a deviation of 10% or 20% is possible;

a glass that is 3 mm or 1 cm thick;

a process for preparing a glass disclosed herein, which includes melting the components and forming a glass without quenching;

a process for preparing a glass disclosed herein, which includes melting the components and forming a glass without quenching, wherein a glass quantity of 2000 g or more, e.g., 2 tons, is prepared in a single batch;

a method for transmitting visible to mid-wave infrared radiation through a glass as disclosed herein; and various products that contain a glass as disclosed herein, e.g., a camera, a detector window, lens, a fiber optic taper, an IR transmitting fiber face plate, a flexible fiber optic image guide, or custom fiber conduit.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

Listed are a number of documents that teach potentially relevant heavy metal oxide glasses:

Kobayasbhi, Development of Infrared Transmitting Glasses, Journal of Non-Crystalline Solids, 316, (2003), 403-406;

Stepien et al., Nonlinear Soft Oxide Glasses for Microstructured optical Fibers Development, Proc. Of SPIE, Vol. 7746, 774619, (2010) 1-8;

Lapp et al., Recent Advances in Heavy Metal Oxide Glass Research, SPIE Vol. 1327, Properties and Characteristics of Optical Glass II, (1990) 162-170;

Dumbaugh et al., Heavy-Metal Oxide Glasses, Journal of the American Ceramic Society, Volume 75, Issue 9, (1992), 2315-2326;

Follet-Houttemane et al., Silica Doped Bismuth Lead Oxyfluorides Glass Ionic Conductors, Solid State Ionics, 181, (2010), 37-40;

U.S. Pat. No. 3,723,141; U.S. Pat. No. 3,947,089; U.S. Pat. No. 5,093,288; U.S. Pat. No. 5,114,884; U.S. Pat. No. 5,168,079; U.S. Pat. No. 5,274,728; U.S. Pat. No. 5,283, 211; U.S. Pat. No. 6,599,852; U.S. Pat. No. 6,599,863; U.S. Pat. No. 6,620,748; U.S. Pat. No. 6,653,251; US20010044369; US20020041750; US20030064878July US20050037913; US20060063660; U.S. Pat. No. 4,674, 835; U.S. Pat. No. 566,806; and U.S. Pat. No. 4,483,931.

The entire disclosures of all applications, patents and publications, cited herein are incorporated by reference herein.

The invention claimed is:

1. A glass suitable for visible to mid-wave infrared radiation transmission, comprising the following components in mol %

| | |
|---|---|
| PbO | 20.00-40.00 |
| $Bi_2O_3$ | 5.00-20.00 |
| $Ga_2O_3$ | 10.00-30.00 |
| $SiO_2$ | 30.00-50.00 |
| $PbF_2$ | 0-20.00 |
| $ZnF_2$ | 0-20.00 |
| $InF_2$ | 0-20.00 |
| Sum of $PbF_2$, $ZnF_2$, and $InF_2$ | 1.00-20.00. |

2. A glass according to claim 1, comprising 22 to 35% PbO.

3. A glass according to claim 1, comprising 8 to 12% $Bi_2O_3$.

4. A glass according to claim 1, comprising 12 to 25% $Ga_2O_3$.

5. A glass according to claim 1, comprising 35 to 45% $SiO_2$.

6. A glass according to claim 1, comprising 5 to 15% total of $PbF_2$, $InF_2$ and/or $ZnF_2$.

7. A glass according to claim 1, which is selected from one of the embodiments A, B and C

| Oxide (mol %) | A | B | C |
|---|---|---|---|
| $SiO_2$ | 42.00 | 42.00 | 42.00 |
| PbO | 25.21 | 25.21 | 25.21 |
| $Bi_2O_3$ | 10.02 | 10.02 | 10.02 |
| $Ga_2O_3$ | 17.77 | 17.77 | 17.77 |
| $PbF_2$ | 5.00 | | |
| $ZnF_2$ | | 5.00 | |
| $InF_2$ | | | 5.00. |

8. A glass according to claim 1, which is selected from one of the embodiments A, B and C

| Oxide (mol %) | A | B | C |
|---|---|---|---|
| $SiO_2$ | 42.00 | 42.00 | 42.00 |
| PbO | 25.21 | 21.25 | 25.21 |
| $Bi_2O_3$ | 10.02 | 10.02 | 10.02 |
| $Ga_2O_3$ | 17.77 | 17.77 | 17.77 |
| $PbF_2$ | 5.00 | | |
| $ZnF_2$ | | 5.00 | |
| $InF_2$ | | | 5.00 | wherein for each amount a deviation of 10% is possible.

9. A glass according to claim 1, which is selected from one of the embodiments A, B and C

| Oxide (mol %) | A | B | C |
|---|---|---|---|
| $SiO_2$ | 42.00 | 42.00 | 42.00 |
| PbO | 25.21 | 25.21 | 25.21 |
| $Bi_2O_3$ | 10.02 | 10.02 | 10.02 |
| $Ga_2O_3$ | 17.77 | 17.77 | 17.77 |
| $PbF_2$ | 5.00 | | |
| $ZnF_2$ | | 5.00 | |
| $InF_2$ | | | 5.00 | wherein for each amount a deviation of 20% is possible, however, wherein the maximum $SiO_2$ amount is 50.00 mol %.

10. A glass according to claim 1, having the following properties

| Properties | |
|---|---|
| Index | 2.25 |
| Density | 5.883 |
| Linear CTE (20-300) $10^{-7}$ W/mK | 76.7 |
| Glass Transition Point, $T_g$ (° C.) | 449 |
| Softening Point (° C.) | 562.5 | wherein for each value a deviation of 10% is possible.

11. A glass according to claim 1, having the following properties

| Properties | |
|---|---|
| Index | 2.25 |
| Density | 5.883 |
| Linear CTE (20-300) $10^{-7}$ W/mK | 76.7 |
| Glass Transition Point, $T_g$ (° C.) | 449 |
| Softening Point (° C.) | 562.5 | wherein for each value a deviation of 20% is possible.

12. A glass according to claim 1, which is 3 mm thick.

13. A glass according to claim 1, which is 1 cm thick.

14. A process for preparing a glass according to claim 1, comprising melting the components and forming a glass without quenching.

15. A process for preparing a glass according to claim 14, wherein a glass quantity of 2000 g or more is prepared in a single batch.

16. A process for preparing a glass according to claim 14, wherein a glass quantity of 2 kg to 2 tons is prepared in a single batch.

17. A method for transmitting visible to mid-wave infrared radiation, comprising transmitting said radiation through a glass according to claim 1.

18. A product selected from the group consisting of a camera, a detector window, lens, a fiber optic taper, an IR transmitting fiber face plate, a flexible fiber optic image guide, or custom fiber conduit, comprising a glass according to claim 1.

19. A glass according to claim 1, comprising

| Oxide (mol %) | |
|---|---|
| $SiO_2$ | 42.00 |
| PbO | 25.21 |
| $Bi_2O_3$ | 10.02 |
| $Ga_2O_3$ | 17.77 |
| $PbF_2$ | 5.00 |
| $ZnF_2$ | |
| $InF_2$. | |

20. A glass according to claim 1, comprising

| Oxide (mol %) | |
|---|---|
| $SiO_2$ | 42.00 |
| PbO | 25.21 |
| $Bi_2O_3$ | 10.02 |
| $Ga_2O_3$ | 17.77 |
| $PbF_2$ | 5.00 |
| $ZnF_2$ | |
| $InF_2$ | | wherein for each amount a deviation of 10% is possible.

21. A glass according to claim 1, comprising

| Oxide (mol %) | |
|---|---|
| SiO$_2$ | 42.00 |
| PbO | 25.21 |
| Bi$_2$O$_3$ | 10.02 |
| Ga$_2$O$_3$ | 17.77 |
| PbF$_2$ | 5.00 |
| ZnF$_2$ | |
| InF$_2$ | | wherein for each amount a deviation of 20% is possible, however, wherein the maximum SiO$_2$ amount is 50.00 mol %.

* * * * *

UNITED STATES PATENT AND TRADEMARK OFFICE
CERTIFICATE OF CORRECTION

PATENT NO. : 8,846,555 B2
APPLICATION NO. : 13/531947
DATED : September 30, 2014
INVENTOR(S) : Simi George et al.

It is certified that error appears in the above-identified patent and that said Letters Patent is hereby corrected as shown below:

In the Claim

Column 7, line 42 Claim 8:   -- PbO     25.21     21.25     25.21 --.

Should read     -- PbO     25.21     25.21     25.21 --.

Signed and Sealed this
Tenth Day of February, 2015

Michelle K. Lee
*Deputy Director of the United States Patent and Trademark Office*